Patented June 13, 1944

2,351,167

UNITED STATES PATENT OFFICE 2,351,167

REMOVAL OF OXYGEN FROM NORMALLY GASEOUS OLEFINS

Virgil W. Ware, Arden, Del., assignor to E. I. du Pont de Nemours & Company, Wilmington, Del., a corporation of Delaware No Drawing. Application October 4, 1941, Serial No. 413,699

12 Claims. (Cl. 266—677)

This invention relates to a method for removing oxygen from olefins, specifically ethylene.

In various chemical processes involving the use of gases, it has been found necessary to reduce the oxygen content of the gas in order that undesirable side reactions or effects may be obviated. Various methods have been proposed in the past including electrolytic, liquefaction, and scrubbing operations but there have been disadvantages in cost or in necessity for regeneration of reagents which have made the prior proposals unattractive from a commercial standpoint. This is particularly true in situations where the oxygen present as an impurity in the gas must be substantially, if not completely, removed. In the polymerization of olefins such as ethylene, for example, even small amounts of oxygen have a marked effect upon the polymerization reaction and it has been found desirable, for such polymerizations, to employ gases from which substantially all the oxygen impurity has been removed.

It is an object of this invention to avoid the disadvantages of the prior art and to provide a new and improved method for the removal of oxygen from olefins containing it.

It is a further object of the present invention to provide a new and improved method for substantially complete removal of oxygen from olefins.

It is a more specific object of the present invention to provide a new and improved method for the removal of oxygen from ethylene. Other objects and advantages of the invention will be apparent from the following specification.

According to the present invention normally gaseous olefins containing oxygen including ethylene, propylene and the butylenes may be purified of their oxygen content by passage of the gases through a deoxidizer comprising a series of at least two catalyst tubes, each of which is followed by a vessel or trap which may contain a chemical or physical absorbent. The use of the traps following the catalyst tubes is an important part of the present invention, and although I do not desire to be limited by it, my explanation of their function is that the trap after each catalyst tube is necessary for optimum oxygen removal because the catalytic oxygen removal step probably involves an equilibrium reaction in which a substance condensible at room temperature is formed and the removal of which substance must take place before the passage of the gas to be purified to the next succeeding catalyst tube. That some type of equilibrium is ordinarily established but which the traps, or vessels filled with absorbent, tend to upset is borne out by the fact that varying amounts of moisture or other absorbed material or both have been distilled from the absorbent in the traps after extended use. I do not believe that my explanation is adversely affected by the fact that efficient oxygen removal has been maintained for relatively short periods of time when using no absorbent whatsoever in the traps.

I have found, further, that the amount of oxygen removed in passage through each tube is about 65 to 75% of the total oxygen content entering that tube. The number of catalyst tubes, with alternate traps, in a given oxygen-removal operation depends, therefore, upon the amount of oxygen present in the gas to be purified. Thus, when ethylene containing 1% oxygen, or 10,000 parts per million is treated for oxygen removal, the exit gas from each tube (with alternate traps maintained at a temperature below that of the catalyst tubes, such as at room temperature) analyzes roughly as follows for oxygen, at least seven catalyst tubes (with alternating traps) being required for substantially complete oxygen removal:

| | P. P. M. |
|---|---|
| After 1st tube | 3,000 |
| After 2nd tube | 900 |
| After 3rd tube | 270 |
| After 4th tube | 80 |
| After 5th tube | 25 |
| After 6th tube | 7 |
| After 7th tube | 2 |

By the method of the present invention the oxygen content of a given gas, such as commercial ethylene, can be reduced to ±1 part per million, or to an oxygen content which is so low as to fall within the range of experimental error in its determination.

The catalyst tubes or vessels through which the gas is passed may contain various catalytic materials, preferably metals or reduction products of metal oxides which, at low temperatures, are known to remove oxygen from hydrogen as, for example, copper, cobalt, and platinum, in the form of the metals or reduced oxides, although I have found that reduced copper oxide gives best results.

The traps, also, may contain various chemical or physical absorbents such as caustic, alumina gel, silica gel, active charcoal and the like, although I have found alumina gel to be preferred.

Following the methods of this invention oxygen removal can also be carried out over a wide range of pressures. The pressures employed in any given application of this invention can therefore be adjusted to conform to the pressures which characterize the process for which an oxygen free gas is being supplied. It is obvious to anyone skilled in the catalyst art that specific temperatures and quantity and rate of gas throughput would vary with the operating pressure and that such factors would have to be adjusted to give the optimum results for the operating pressure selected.

Preferably, however, this invention is practiced at a pressure of from 25 to 1500 atmospheres and at temperatures of from 75 to 200° C. Higher and lower pressures may be employed, as indicated above, although the best results have been obtained in the specific ranges above designated.

In the following examples, which illustrate how this invention may be practiced, by the term space velocity it is meant to describe the volume of gas at standard temperature and pressure per hour per volume of converter (or catalyst tube) space.

*Example 1.*—Three pressure-resistant copper-lined catalyst tubes, each of 400 cc. capacity and fitted with thermocouples and high pressure connections, were arranged in series with two intermediate pressure-resistant vessels or traps of 700 cc. capacity and filled with alumina gel. The catalyst tubes were filled with granular reduced copper oxide. There resulted a deoxodizing unit containing three catalyst tubes with two alternating alumina gel traps, all five vessels connected in series. Although all the vessels of the deoxidizer were horizontally arranged, vertical or other arrangement could also be employed so long as the traps can function to remove the condensible material from the gas streams.

The traps were maintained at atmospheric temperature while the two catalyst tubes were steam jacketed so that any temperature between 100° C. and 170° C. could be maintained.

Into the deoxidizing unit above described there was introduced ethylene containing 70 parts per million of oxygen at a space velocity of 5000. The temperature of the catalyst tubes was maintained at 100° C. and the ethylene pressure at 1000 atmospheres. After the first catalyst tube, the oxygen content of ethylene was found to be 18 P. P. M., after the second catalyst tube the oxygen content was found to be 5 P. P. M. and after the third catalyst tube the oxygen content was found to ±1 part per million of total gas. For a period of approximately 3 months of constant operation, this deoxidizing unit supplied ethylene with less than 1 part per million of oxygen.

In comparison with the preferred procedure such as set forth in the example, I have found that when but one catalyst tube is employed, at a given ethylene pressure, catalyst temperature, and space velocity, the effectiveness is much lower than that of the present preferred procedure. Thus, for example, at an ethylene pressure of 1000 atmospheres, a catalyst temperature of 100° C., space velocity of 1200 and with an initial oxygen concentration of 180 parts per million, a single catalyst tube will cut down the oxygen content to approximately 50 parts per million. By the use of two catalyst tubes with a trap between, the other conditions remaining the same, at the exit of the first tube the oxygen concentration is 52 parts per million and at the exit from the second tube the oxygen concentration is 22 parts per million. As a further comparison, when using two catalyst tubes without any trap between, the other conditions remaining the same, there is no appreciable reduction in the oxygen concentration between the exit of the first and second tubes.

Various changes may be made in the details and preferred embodiments of this invention without departing therefrom or sacrificing any of the advantages thereof.

I claim:

1. In a process for removing oxygen from ethylene containing the same, the step which comprises passing such ethylene through a deoxidizer comprising a series of at least two vessels containing reduced copper oxide and separated by a vessel containing an absorbent material, the vessel containing the absorbent material being maintained at a lower temperautre than the reduced copper oxide-containing vessels, the ethylene being passed through the reduced copper oxide-containing vessels at a temperature in the range of from 75 to 200° C.

2. In a process for removing oxygen from ethylene containing the same, the step which comprises passing such ethylene through a deoxidizer comprising a series of at least two vessels containing metallic copper and separated by a vessel containing an absorbent material, the vessel containing the absorbent material being maintained at a lower temperature than the metallic copper-containing vessels, the ethylene being passed through the metallic copper-containing vessels at a temperature in the range of from 75 to 200° C.

3. In a process for removing oxygen from ethylene containing the same, the step which comprises passing such ethylene through a deoxidizer comprising a series of at least two vessels containing reduced copper oxide and separated by a vessel containing an absorbent material, the vessel containing the absorbent material being maintained at a lower temperature than the reduced copper oxide-containing vessels, the ethylene being passed through the reduced copper oxide-containing vessels at a temperature in the range of from 75 to 200° C., and the absorbent material-containing vessels being maintained at a temperature in the range of from 15 to 60° C., the operating pressures being maintained at a pressure in the range of from 25 to 1500 atmospheres.

4. In a process for removing oxygen from a normally gaseous olefin containing the same, the step which comprises passing such olefin through a deoxidizer comprising a series of at least two vessels, containing a catalyst selected from the group consisting of copper, cobalt and platinum and their reduced oxides, and separated by a vessel containing no catalyst and maintained at a lower temperature than the catalyst-containing vessels.

5. In a process for removing oxygen from a normally gaseous olefin containing the same, the step which comprises passing such olefin through a deoxidizer comprising a series of at least two vessels, containing a catalyst selected from the group consisting of copper, cobalt and platinum and their reduced oxides, and separated by a vessel containing an absorbent material and maintained at a lower temperature than the catalyst-containing vessels.

6. In a process for removing oxygen from a normally gaseous olefin containing the same, the step which comprises passing such olefin through a deoxidizer comprising a series of at least two vessels, containing a catalyst selected from the group consisting of copper, cobalt and platinum and their reduced oxides, and separated by a vessel containing no catalyst and maintained at a lower temperature than the catalyst-containing vessels, the olefin being passed through the catalyst-containing vessels at a temperature in the range of from 75 to 200° C.

7. In a process for removing oxygen from ethylene containing the same, the step which comprises passing such ethylene through a deoxidizer comprising a series of at least two vessels containing a catalyst selected from the group consisting of copper, cobalt, platinum and their reduced oxides and separated by a vessel containing an absorbent material, maintained at a lower temperature than the catalyst-containing vessels, the ethylene being passed through the catalyst containing vessels at a temperature within the range of 75 to 200° C.

8. In a process for removing oxygen from ethylene containing the same, the step which comprises passing such ethylene through a deoxidizer comprising a series of at least two vessels containing a catalyst selected from the group consisting of copper, cobalt and platinum and their reduced oxides, and separated by a vessel containing no catalyst and maintained at a lower temperature than the catalyst-containing vessels.

9. In a process for removing oxygen from ethylene containing the same, the step which comprises passing such ethylene through a deoxidizer comprising a series of at least two vessels containing a catalyst selected from the group consisting of copper, cobalt and platinum and their reduced oxides, and separated by a pressure-resistant vessel containing an absorbent material and maintained at a lower temperature than the catalyst-containing vessels.

10. In a process for removing oxygen from ethylene containing the same, the step which comprises passing such ethylene through a deoxidizer comprising a series of at least two vessels containing a catalyst selected from the group consisting of copper, cobalt and platinum and their reduced oxides, and separated by a vessel containing no catalyst and maintained at a lower temperature than the catalyst-containing vessels, the ethylene being passed through the catalyst-containing vessels at a temperature in the range of from 75 to 200° C.

11. In a process for removing oxygen from ethylene containing the same, the step which comprises passing such ethylene through a deoxidizer comprising a series of at least two vessels containing a catalyst selected from the group consisting of copper, cobalt and platinum and their reduced oxides, and separated by a vessel containing an absorbent material and maintained at a lower temperature than the catalyst-containing vessels, the ethylene being passed through the catalyst-containing vessels at a temperature in the range of from 75 to 200° C.

12. In a process for removing oxygen from ethylene containing the same, the step which comprises passing such ethylene through a deoxidizer comprising a series of at least two vessels containing a catalyst selected from the group consisting of copper, cobalt and platinum and their reduced oxides, and separated by a pressure-resistant vessel containing alumina gel and maintained at a lower temperature than the catalyst-containing vessels.

VIRGIL W. WARE.